US008589469B2

(12) United States Patent
Olofsson et al.

(10) Patent No.: US 8,589,469 B2
(45) Date of Patent: Nov. 19, 2013

(54) BANDWIDTH EFFICIENT INSTRUCTION-DRIVEN MULTIPLICATION ENGINE

(75) Inventors: Andreas D. Olofsson, Lexington, MA (US); Baruch Yanovitch, Ranana (IL)

(73) Assignee: Analog Devices Technology, Hamilton (BM)

( * ) Notice: Subject to any disclaimer, the term of this patent is extended or adjusted under 35 U.S.C. 154(b) by 1040 days.

(21) Appl. No.: 12/008,334

(22) Filed: Jan. 10, 2008

(65) Prior Publication Data
US 2008/0222226 A1 Sep. 11, 2008

Related U.S. Application Data (60) Provisional application No. 60/879,760, filed on Jan. 10, 2007.

(51) Int. Cl.
*G06F 7/52* (2006.01)

(52) U.S. Cl.
USPC .......................................... 708/620; 712/221

(58) Field of Classification Search
None
See application file for complete search history.

(56) References Cited

U.S. PATENT DOCUMENTS

| 4,685,077 | A | * | 8/1987 | Loo ............................... 708/627 |
| 4,939,687 | A | * | 7/1990 | Hartley et al. ................. 708/625 |
| 5,001,661 | A | * | 3/1991 | Corleto et al. ................. 708/322 |
| 5,072,418 | A | * | 12/1991 | Boutaud et al. ............... 708/207 |
| 5,113,364 | A | * | 5/1992 | Ho et al. ........................ 708/625 |
| 5,880,981 | A | * | 3/1999 | Kojima et al. ................. 708/523 |
| 6,038,675 | A | * | 3/2000 | Gabzdyl et al. ............... 713/600 |
| 6,289,417 | B1 | * | 9/2001 | Larri .............................. 711/131 |

* cited by examiner

Primary Examiner — Lewis A Bullock, Jr.
Assistant Examiner — Christine Dang
(74) Attorney, Agent, or Firm — Patent Capital Group (57) ABSTRACT

Multiplication engines and multiplication methods are provided for a digital processor. A multiplication engine includes multipliers, each receiving a first operand and a second operand; a local operand register having locations to hold the first operands for respective multipliers; a first operand bus coupled to the local operand register to supply the first operands from a compute register file to the local operand register; a second operand bus coupled to the plurality of multipliers to supply one or more of the second operands from the compute register file to respective multipliers; and a control unit responsive to a digital processor instruction to supply the first operands from the local operand register to respective multipliers, to supply the second operands from the compute register file to respective multipliers on the second operand bus and to multiply the first operands by the respective second operands in the respective multipliers, wherein one or more of the first operands in the local operand register are reused by the multipliers in two or more multiplication operations.

13 Claims, 8 Drawing Sheets

Filter Calculation Method

| d30 | d29 | d28 | d27 | d26 | d25 | d24 | d23 | d22 | d21 | d20 | d19 | d18 | d17 | d16 | d15 |
|---|---|---|---|---|---|---|---|---|---|---|---|---|---|---|---|
| c14 | c13 | c12 | c11 | c10 | c9 | c8 | c7 | c6 | c5 | c4 | c3 | c2 | c1 | c0 | c15 |
| c13 | c12 | c11 | c10 | c9 | c8 | c7 | c6 | c5 | c4 | c3 | c2 | c1 | c0 | c15 | c14 |
| c12 | c11 | c10 | c9 | c8 | c7 | c6 | c5 | c4 | c3 | c2 | c1 | c0 | c15 | c14 | c13 |
| c11 | c10 | c9 | c8 | c7 | c6 | c5 | c4 | c3 | c2 | c1 | c0 | c15 | c14 | c13 | c12 |
| c10 | c9 | c8 | c7 | c6 | c5 | c4 | c3 | c2 | c1 | c0 | c15 | c14 | c13 | c12 | c11 |
| c9 | c8 | c7 | c6 | c5 | c4 | c3 | c2 | c1 | c0 | c15 | c14 | c13 | c12 | c11 | c10 |
| c8 | c7 | c6 | c5 | c4 | c3 | c2 | c1 | c0 | c15 | c14 | c13 | c12 | c11 | c10 | c9 |
| c7 | c6 | c5 | c4 | c3 | c2 | c1 | c0 | c15 | c14 | c13 | c12 | c11 | c10 | c9 | c8 |
| c6 | c5 | c4 | c3 | c2 | c1 | c0 | c15 | c14 | c13 | c12 | c11 | c10 | c9 | c8 | c7 |
| c5 | c4 | c3 | c2 | c1 | c0 | c15 | c14 | c13 | c12 | c11 | c10 | c9 | c8 | c7 | c6 |
| c4 | c3 | c2 | c1 | c0 | c15 | c14 | c13 | c12 | c11 | c10 | c9 | c8 | c7 | c6 | c5 |
| c3 | c2 | c1 | c0 | c15 | c14 | c13 | c12 | c11 | c10 | c9 | c8 | c7 | c6 | c5 | c4 |
| c2 | c1 | c0 | c15 | c14 | c13 | c12 | c11 | c10 | c9 | c8 | c7 | c6 | c5 | c4 | c3 |
| c1 | c0 | c15 | c14 | c13 | c12 | c11 | c10 | c9 | c8 | c7 | c6 | c5 | c4 | c3 | c2 |
| c0 | c15 | c14 | c13 | c12 | c11 | c10 | c9 | c8 | c7 | c6 | c5 | c4 | c3 | c2 | c1 |
| c15 | c14 | c13 | c12 | c11 | c10 | c9 | c8 | c7 | c6 | c5 | c4 | c3 | c2 | c1 | c0 |

Step 1: TR15:0 = c0  [d15..d0] = c0d15, c0d14, c0d13 ,...., c0d3, c0d2, c0d1, c0d0
Step 2: TR15:0 += c1  [d16..d1] = c1d16, c1d15, c1d14 ,...., c1d4, c1d3, c1d2, c1d1
Step 3: TR15:0 += c2  [d17..d2] = c2d17, c2d16, c2d15 ,...., c2d5, c2d4, c2d3, c2d2
Step 4: TR15:0 += c3  [d18..d3] = c3d18, c3d17, c3d16 ,...., c3d6, c3d5, c3d4, c3d3

FIG. 6A

| FIG. 6A | FIG. 6B |

Matrix Multiplication Method $$\begin{bmatrix} A0 & B0 & C0 & D0 \\ A1 & B1 & C1 & D1 \\ A2 & B2 & C2 & D2 \\ A3 & B3 & C3 & D3 \end{bmatrix} \times \begin{bmatrix} A0 & A1 & A2 & A3 \\ B0 & B1 & B2 & B3 \\ C0 & C1 & C2 & C3 \\ D0 & D1 & D2 & D3 \end{bmatrix} = \begin{bmatrix} S(0,0) & S(0,1) & S(0,2) & S(0,3) \\ S(1,0) & S(1,1) & S(1,2) & S(1,3) \\ S(2,0) & S(2,1) & S(2,2) & S(2,3) \\ S(3,0) & S(3,1) & S(3,2) & S(3,3) \end{bmatrix}$$

Columns of left matrix: Ai, Bi, Ci, Di. Rows of middle matrix: Ai, Bi, Ci, Di.

$\underline{S}$ = <Ai, Ai> + <Bi, Bi> + <Ci, Ci> + <Di, Di>  ←— Sum of Dot Product $$\underline{S} = \begin{bmatrix} S(0,0) & S(0,1) & S(0,2) & S(0,3) \\ S(1,0) & S(1,1) & S(1,2) & S(1,3) \\ S(2,0) & S(2,1) & S(2,2) & S(2,3) \\ S(3,0) & S(3,1) & S(3,2) & S(3,3) \end{bmatrix} =$$

$$\underline{A} = \begin{bmatrix} A0A0 & A0A1 & A0A2 & A0A3 \\ A1A0 & A1A1 & A1A2 & A1A3 \\ A2A0 & A2A1 & A2A2 & A2A3 \\ A3A0 & A3A1 & A3A2 & A3A3 \end{bmatrix} + \underline{B} = \begin{bmatrix} B0B0 & B0B1 & B0B2 & B0B3 \\ B1B0 & B1B1 & B1B2 & B1B3 \\ B2B0 & B2B1 & B2B2 & B2B3 \\ B3B0 & B3B1 & B3B2 & B3B3 \end{bmatrix} +$$

$$\underline{C} = \begin{bmatrix} C0C0 & C0C1 & C0C2 & C0C3 \\ C1C0 & C1C1 & C1C2 & C1C3 \\ C2C0 & C2C1 & C2C2 & C2C3 \\ C3C0 & C3C1 & C3C2 & C3C3 \end{bmatrix} + \underline{D} = \begin{bmatrix} D0D0 & D0D1 & D0D2 & D0D3 \\ D1D0 & D1D1 & D1D2 & D1D3 \\ D2D0 & D2D1 & D2D2 & D2D3 \\ D3D0 & D3D1 & D3D2 & D3D3 \end{bmatrix}$$

*FIG. 7*

BANDWIDTH EFFICIENT INSTRUCTION-DRIVEN MULTIPLICATION ENGINE

CROSS REFERENCE TO RELATED APPLICATION

This application claims priority based on Provisional Application Ser. No. 60/879,760, filed Jan. 10, 2007, which is hereby incorporated by reference in its entirety.

FIELD OF THE INVENTION

This invention relates to digital signal processors and, more particularly, to a software programmable complex multiplication engine.

BACKGROUND OF THE INVENTION

Advanced wireless networks require significant hardware acceleration in order to perform functions such as beamforming and path searching. To address these data processing requirements, CDMA systems often implement these algorithms directly with a dedicated ASIC or an on-chip coprocessor unit. Although this approach offers the highest potential performance, it carries significant design risks and is very inflexible to changes in standards and algorithms.

These and other algorithms usually involve multiplication operations. One of the limiting factors in a high performance multiplication engine is the rate at which data can be supplied to the engine from a register file or a memory. The speed and width of data buses can be increased, but at the expense of chip area and power dissipation. A further factor is that data is often reused in digital signal processing algorithms, such as FIR digital filters.

Accordingly, there is a need for improved multiplication engines and multiplication methods.

SUMMARY OF THE INVENTION

According to a first aspect of the invention, a multiplication engine is provided for a digital processor. The multiplication engine comprises a plurality of multipliers, each receiving a first operand and a second operand; a local operand register having a plurality of locations to hold the first operands for respective ones of the multipliers; a first operand bus coupled to the local operand register to supply the first operands from a compute register file to the local operand register; a second operand bus coupled to the plurality of multipliers to supply one or more of the second operands from the compute register file to respective ones of the multipliers; and a control unit responsive to a digital processor instruction to supply the first operands from the local operand register to respective ones of the multipliers, to supply the second operands from the compute register file to respective ones of the multipliers on the second operand bus and to multiply the first operands by the respective second operands in the respective multipliers, wherein one or more of the first operands in the local operand register are reused by the plurality of multipliers in two or more multiplication operations.

According to a second aspect of the invention, a method is provided for performing multiplication in a digital processor. The method comprises providing a plurality of multipliers; providing a local operand register having a plurality of locations to hold first operands for respective ones of the multipliers; supplying the first operands from a compute register file to the local operand register on a first operand bus; supplying second operands from the compute register file to respective ones of the multipliers on a second operand bus; controlling operation of the multipliers and the local operand register in response to a digital processor instruction by supplying the first operands from the local operand register to respective ones of the multipliers, supplying the second operands from the compute register file to respective ones of the multipliers on the second operand bus and multiplying the first operands by the respective second operands in respective ones of the multipliers; and reusing one or more of the first operands in the local operand register in two or more multiplication operations by the plurality of multipliers.

According to a third aspect of the invention, a multiplication engine is provided for a digital processor. The multiplication engine comprises a multiplier circuit, a register file to supply data to the multiplier circuit, the register file including a plurality of register locations in a shift configuration, and a control circuit to load data from a data source into the register file and to shift data in the register file after a multiply instruction is executed, wherein data in the register file is used by two or more multiply instructions.

According to a fourth aspect of the invention, a method is provided for digital processing in a multiplication engine including a multiplier circuit and a register file to supply data to the multiplier circuit. The method comprises loading data from a data source into the register file, executing a first multiply instruction using data in the register file, shifting data in the register file from current register locations to next register locations after execution of the first multiply instruction, and executing a second multiply instruction using the shifted data in the register file.

BRIEF DESCRIPTION OF THE DRAWINGS

For a better understanding of the present invention, reference is made to the accompanying drawings, which are incorporated herein by reference and in which:

FIG. 7 is a schematic diagram that illustrates a matrix multiplication calculation in accordance with an embodiment of the invention.

DETAILED DESCRIPTION

Figure 1:
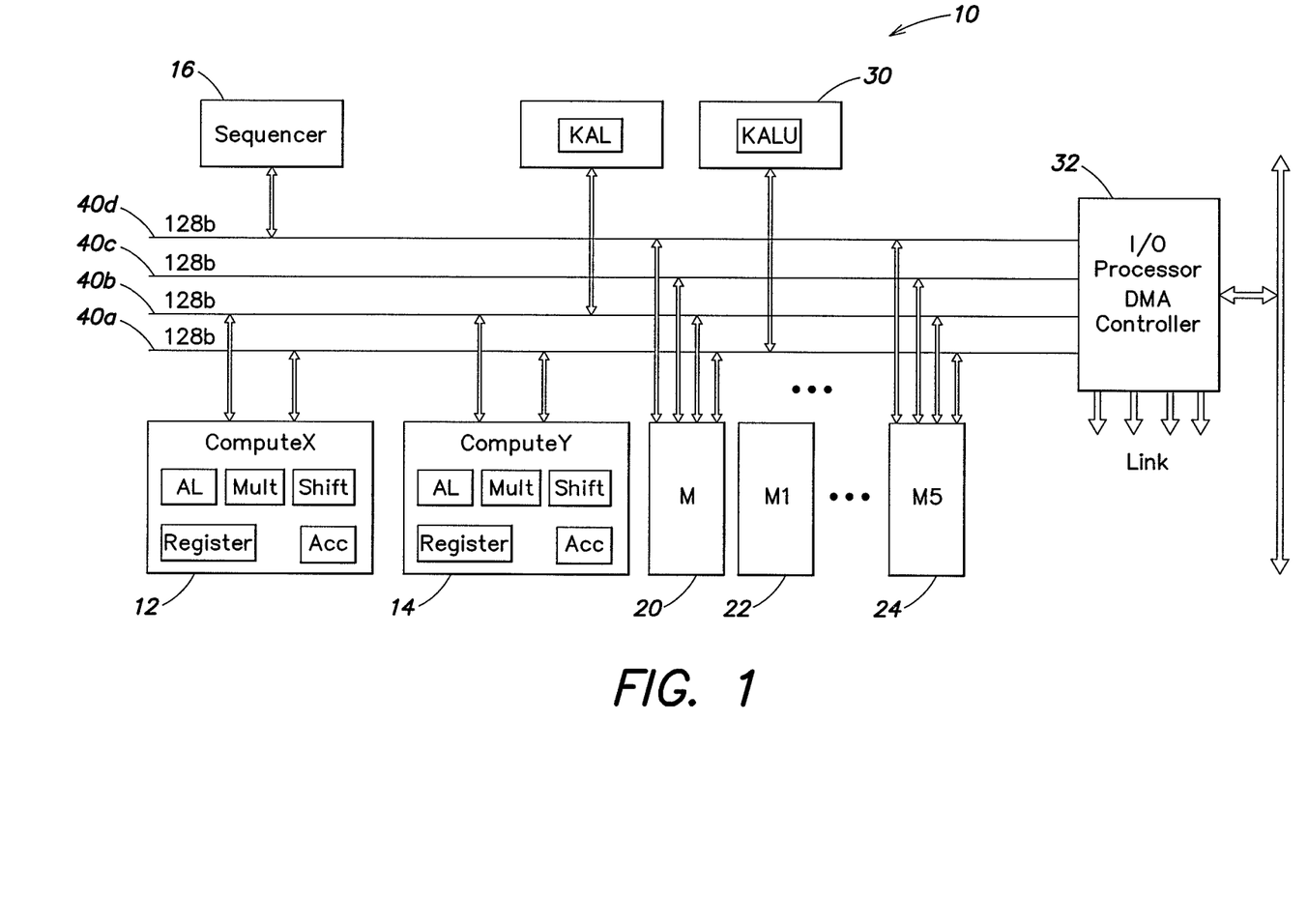
FIG. 1 is a block diagram showing an example of a digital signal processor architecture.

A block diagram of an example of a digital signal processor (DSP) 10 suitable for incorporation of the present invention is shown in FIG. 1. The digital signal processor may be the TigerSharc digital signal processor manufactured and sold by Analog Devices, Inc., Norwood, Mass., for example. The digital signal processor 10 may include a compute X block 12, a compute Y block 14, an instruction sequencer 16, memory blocks 20, 22, 24, an integer ALU 30 and an I/O processor or DMA controller 32. The elements of DSP 10 are interconnected by data and address buses 40a, 40b, 40c and 40d.

Figure 2:
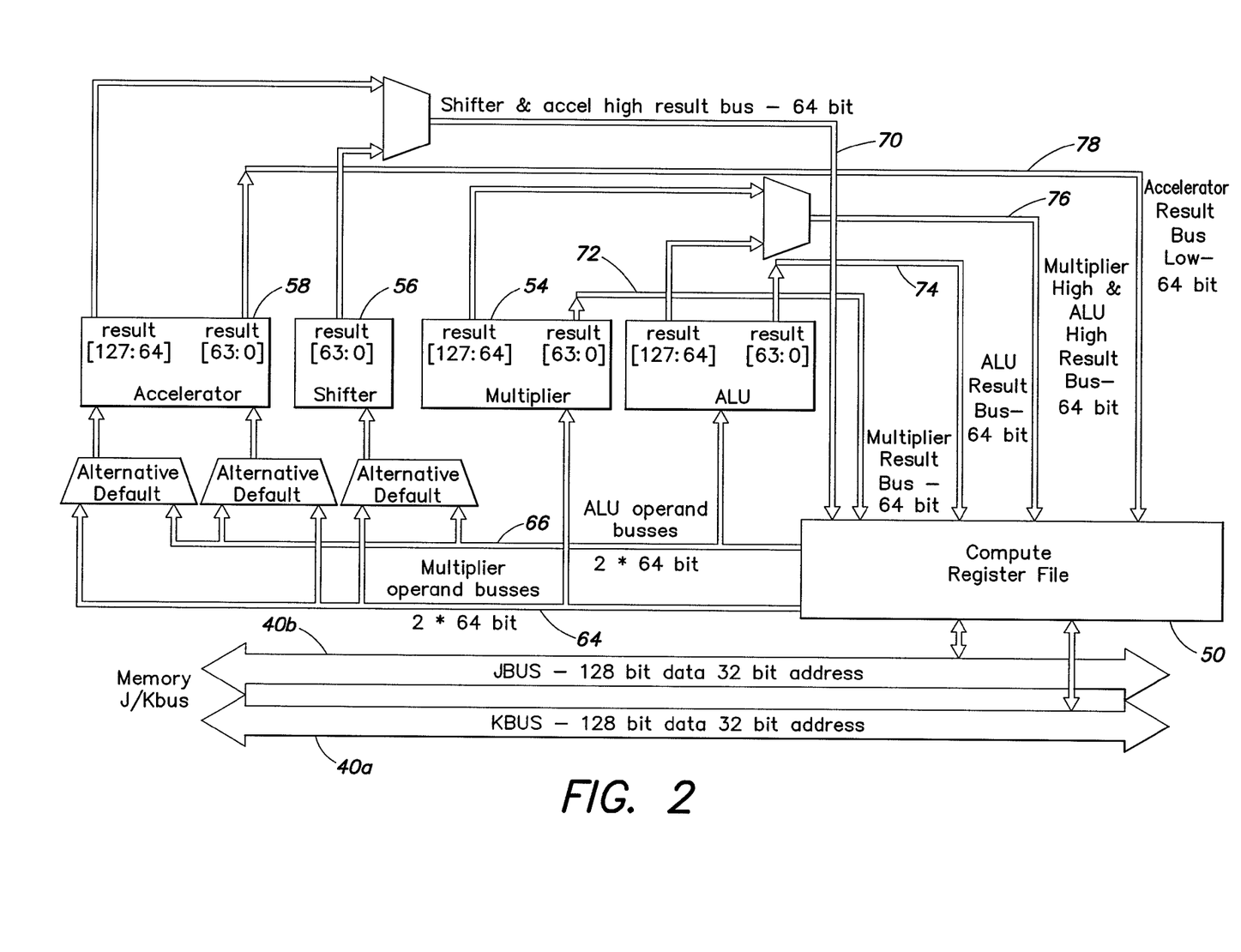
FIG. 2 is a block diagram showing an example of a compute block in the digital signal processor.

An example of compute blocks 12 and 14 is shown in FIG. 2. The compute block includes a compute register file 50 and several computation units. The computation units include an ALU 52, a multiplier 54, a shifter 56 and an accelerator 58. Compute register file 50 receives data on buses 40a and 40b and supplies operands to the computation units on operand buses 64 and 66. The results of the computations are supplied on result buses 70, 72, 74, 76 and 78 to compute register file 50. The results may be written to memory from compute register file 50 or supplied to the computation units for subsequent computations.

Figure 3:
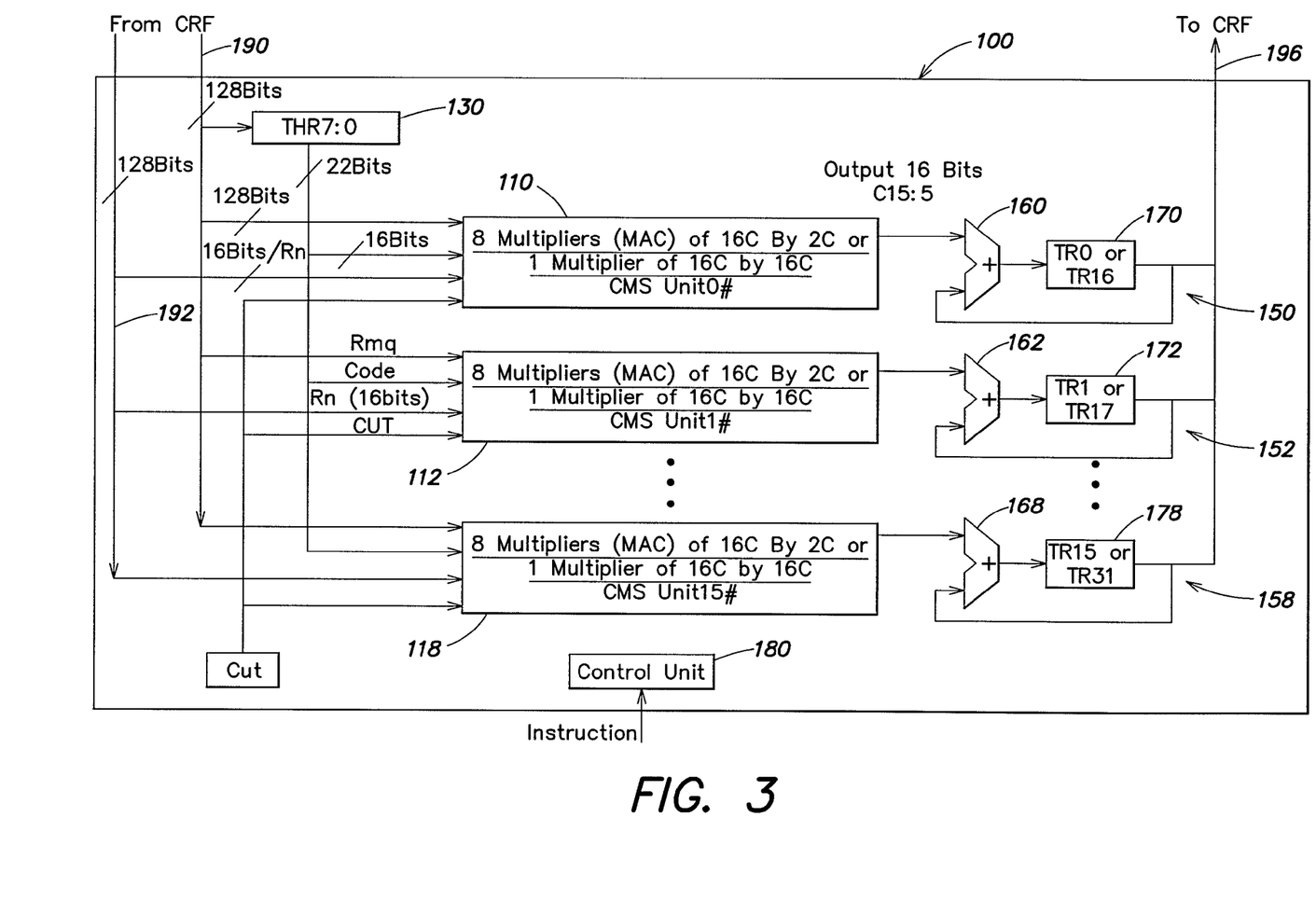
FIG. 3 is a block diagram that illustrates a multiplication engine in accordance with an embodiment of the invention.
Figure 4:
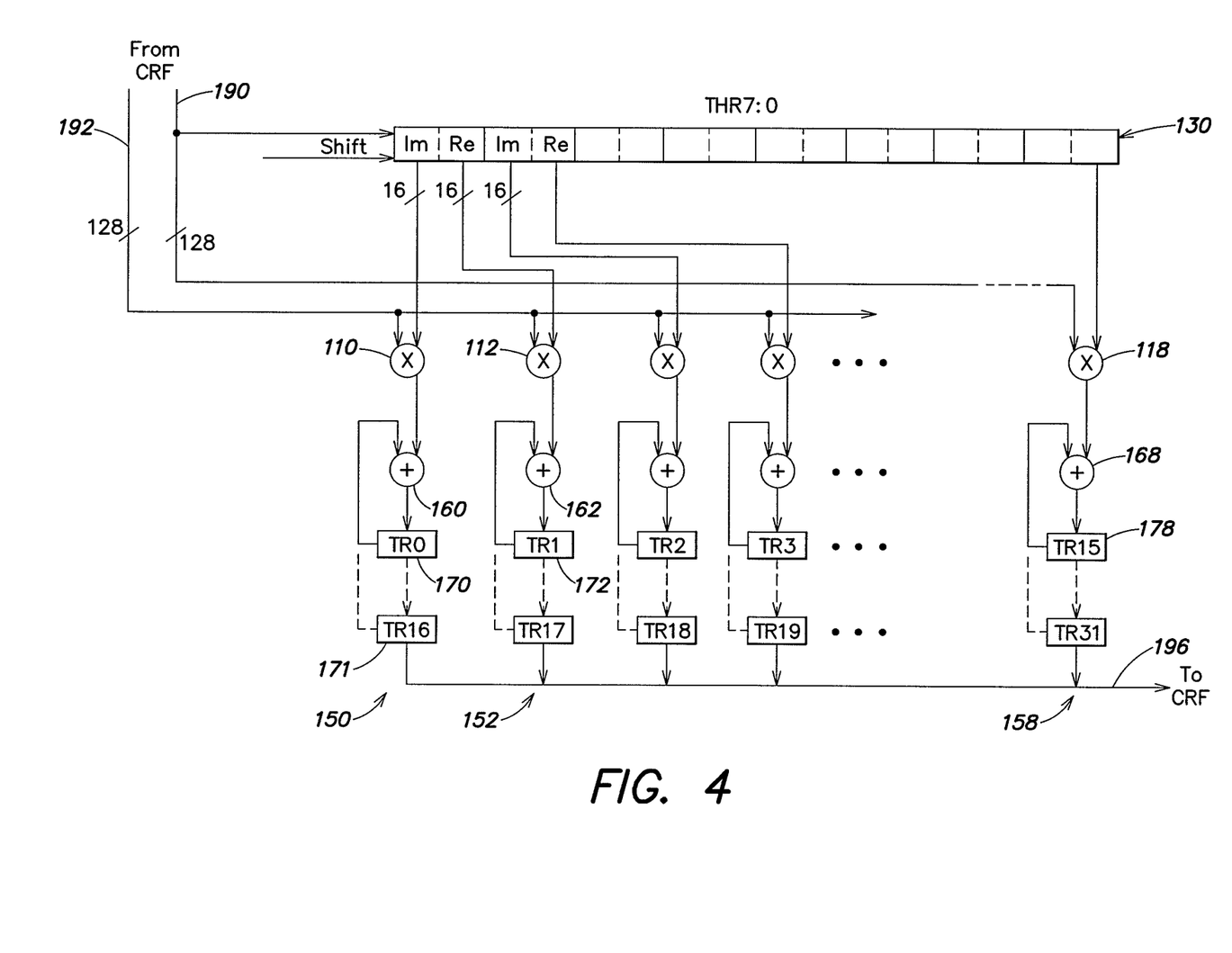
FIG. 4 is a schematic block diagram that illustrates the multiplication engine of FIG. 3 in greater detail.
Figure 5:
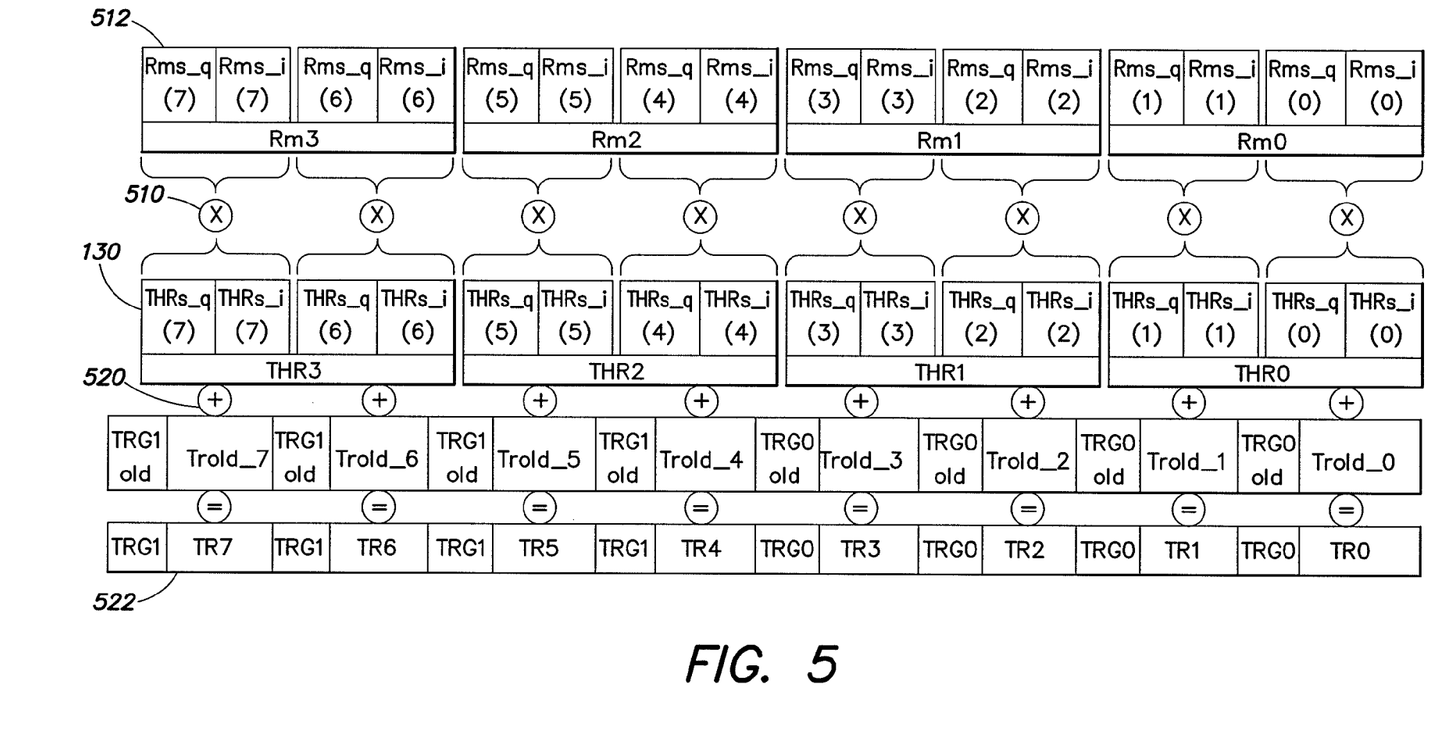
FIG. 5 is a schematic block diagram that illustrates the registers involved in the operation of the multiplication engine of FIG. 3.

A multiplication engine 100 in accordance with an embodiment of the invention is shown in FIGS. 3-5. Multiplication engine 100 may correspond to multiplier 54 shown in FIG. 2, may be used in accelerator 58, or both. The multiplication engine 100 includes multiplier units 110, 112, . . . 118. In the embodiment of FIGS. 3-5, multiplication engine 100 includes 16 multiplier units. Multiplication engine 100 further includes a local operand register 130 coupled to each of multiplier units 110, 112, . . . 118. The outputs of multiplier units 110, 112, . . . 118 are supplied to accumulators 150, 152, . . . 158, respectively. Each accumulator may include a summing unit and an accumulation register. In some embodiments, each of accumulators 150, 152, . . . 158 includes two accumulation registers for enhanced performance. Thus, accumulator 150 includes a summing unit 160 and an accumulation register 170, and may include a second accumulation register 171 (FIG. 4). Multiplication engine 100 further includes a control unit 180 that controls the components of multiplication engine 100 in response to instructions being executed.

Multiplication engine 100 receives operands from compute register file 50 (FIG. 2) on a first operand bus 190 and a second operand bus 192. Results are returned to compute register file 50 on a result bus 196. First operand bus 190 is coupled to local operand register 130 and to each of multiplier units 110, 112, . . . 118. Second operand bus 192 is coupled to each of multiplier units 110, 112, . . . 118.

Each of the multiplier units 110, 112, . . . 118 can be configured in response to an instruction being executed. In one configuration, each of the multiplier units is configured as eight multipliers of 16 bits by 2 bits. In another configuration, each of the multiplier units is configured as a single multiplier of 16 bits by 16 bits.

Local operand register 130 provides local storage of operands used by multiplier units 110, 112, . . . 118. Local operand register 130 is useful where operands are reused by the multiplier units for two or more calculations. In some configurations, the same operands are used for two or more consecutive computations by the same multiplier units. In other configurations, operands are reused by different multiplier units for consecutive computations and the operands in local operand register 130 are shifted after completion of a computation. By holding operands that are reused in local operand register 130, transfer of data on operand buses 190 and 192 is reduced and operating efficiency is increased.

As shown in FIG. 5, the multiplier units of multiplication engine 100 may be configured as complex multipliers 510, each of which receives a first operand from local operand register 130 (THR register) and real and imaginary parts of a second operand from an Rms register 512 in compute register file 50. For example, the second operand may be an input data value and the first operand may be a coefficient. The multiplication engine 100 further includes complex summing units 520, each of which performs complex addition of a value output by complex multiplier 510 and a previous value. In particular, the output of each multiplier 510 is summed with a previous value in an accumulation register 522 to provide a current value that is placed in the accumulation register. In the embodiment of FIG. 5, multiplication engine 100 includes eight complex multipliers 510 and eight complex summing units 520. The complex multipliers correspond to the multiplier units 110, 112, . . . 118 shown in FIG. 3, the complex summing units correspond to summing units 160, 162, . . . 168 shown in FIG. 3, and the accumulation registers 522 correspond to accumulation registers 170, 172, . . . 178 shown in FIG. 3.

In the embodiment of FIG. 5, Rms registers 512 may be located in compute register file 50 (FIG. 2). Local operand register 130 and accumulation registers 522 may be located in close proximity to complex multipliers 510. Local operand register 130 is configured to perform shift operations as described below.

In the embodiment of FIG. 5, local operand register 130 includes eight operands, each having 16 bits, including 8 bits real and 8 bits imaginary. Control circuit 180 (FIG. 3) causes operands to be loaded into local operand register 130 from compute register file 50 when operands are needed for multiply instructions. The operands in local operand register 130 are used to execute a multiply instruction as shown in FIG. 5. After the multiply instruction has been executed, control circuit 180 causes the operands in local operand register 130 to be shifted to the right. In the case of 16-bit operands, the operands are shifted 16 bits to the right by control circuit 180. In addition, a new operand value is loaded from compute register file 50 to local operand register 130. Then, a second multiply instruction is executed with the shifted operands in local operand register 130. This process can be repeated until all computations have been completed. In each calculation, the operands contained in local operand register 130 are multiplied by operands supplied from the Rms registers 512 in compute register file 50. If necessary, a new set of operands can be loaded into local operand register 130 by control circuit 180. Thus, two or more multiply instructions can be executed without reloading local operand register 130 with a complete set of new operands after each multiply instruction.

The multiplication engine can be used to execute an FIR filter instruction as follows.

$$TRsh+=Rms**THRo, THR7h=Rss(j)(clr)(sho)(mhl)\\(shl)$$

Where:
  Rms—is an input single short coefficient.
  THRo—is an octal register data—inhabits 16 data numbers.
  THR7h—is the msb short in the THR7:0 registers.
  Rss—is a short operand which is loaded into the msb THR.
  j—for conjugate multiplication option.
  clr—clears the TR accumulators.
  sho—for real 8 bit multiplications.
  mhl—high/low Rms
  shl—high/low Rss The instruction makes 16 complex multiplications and afterwards shifts the contents of local operand register 130 (THR 7:0) by 16 bits to the right and updates the THR7h location by the new short word data from the compute register file.

Example (from FIG. 6)
  Step 1: TR15:0=c0[d15 . . . d0]=c0d15, c0d14, c0d13, . . . , c0d3, c0d2, c0d1, c0d0

Figure 6A:
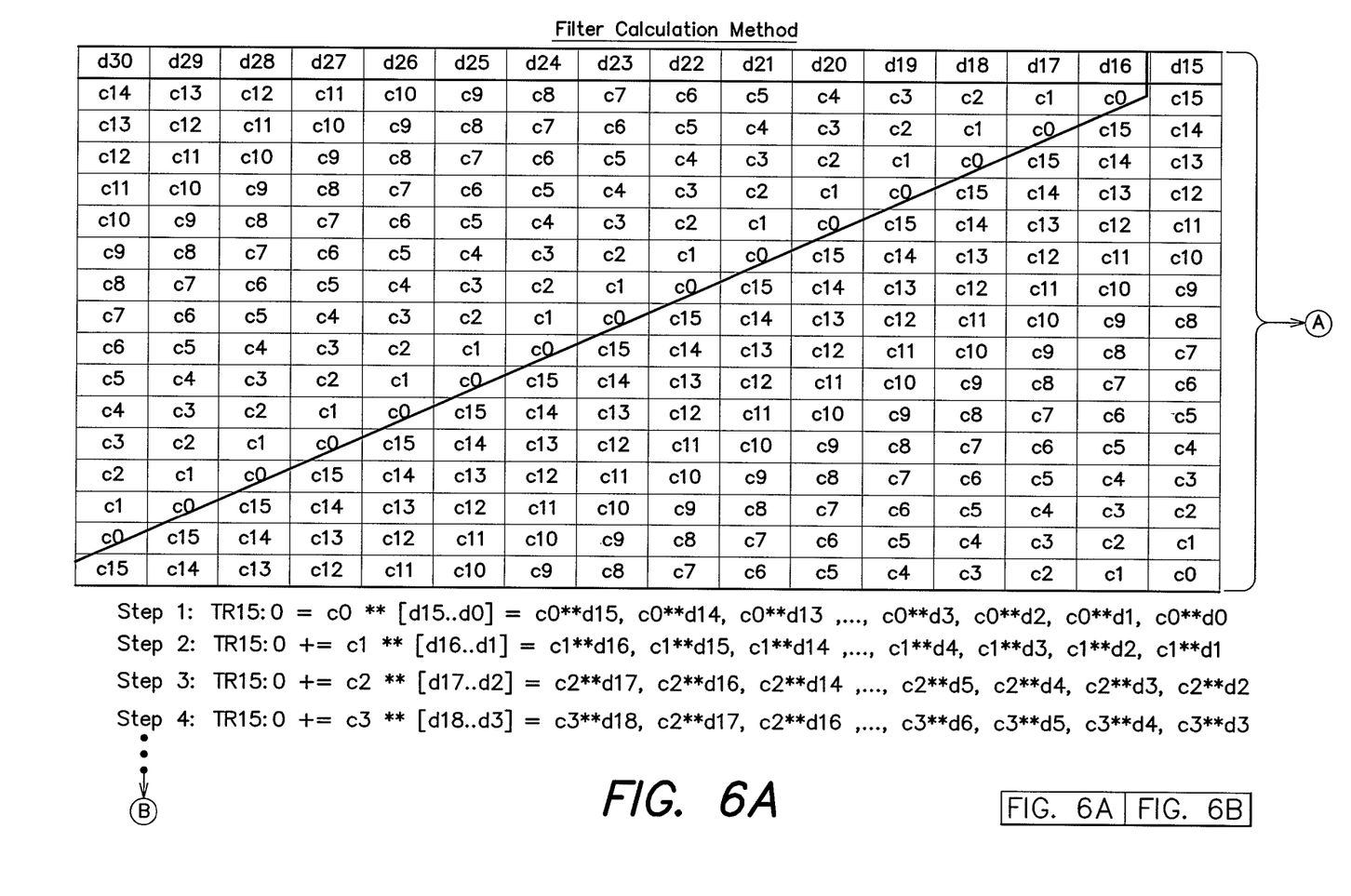
FIG. 6 is a schematic diagram that illustrates an FIR filter calculation in accordance with an embodiment of the invention.
Figure 6B:
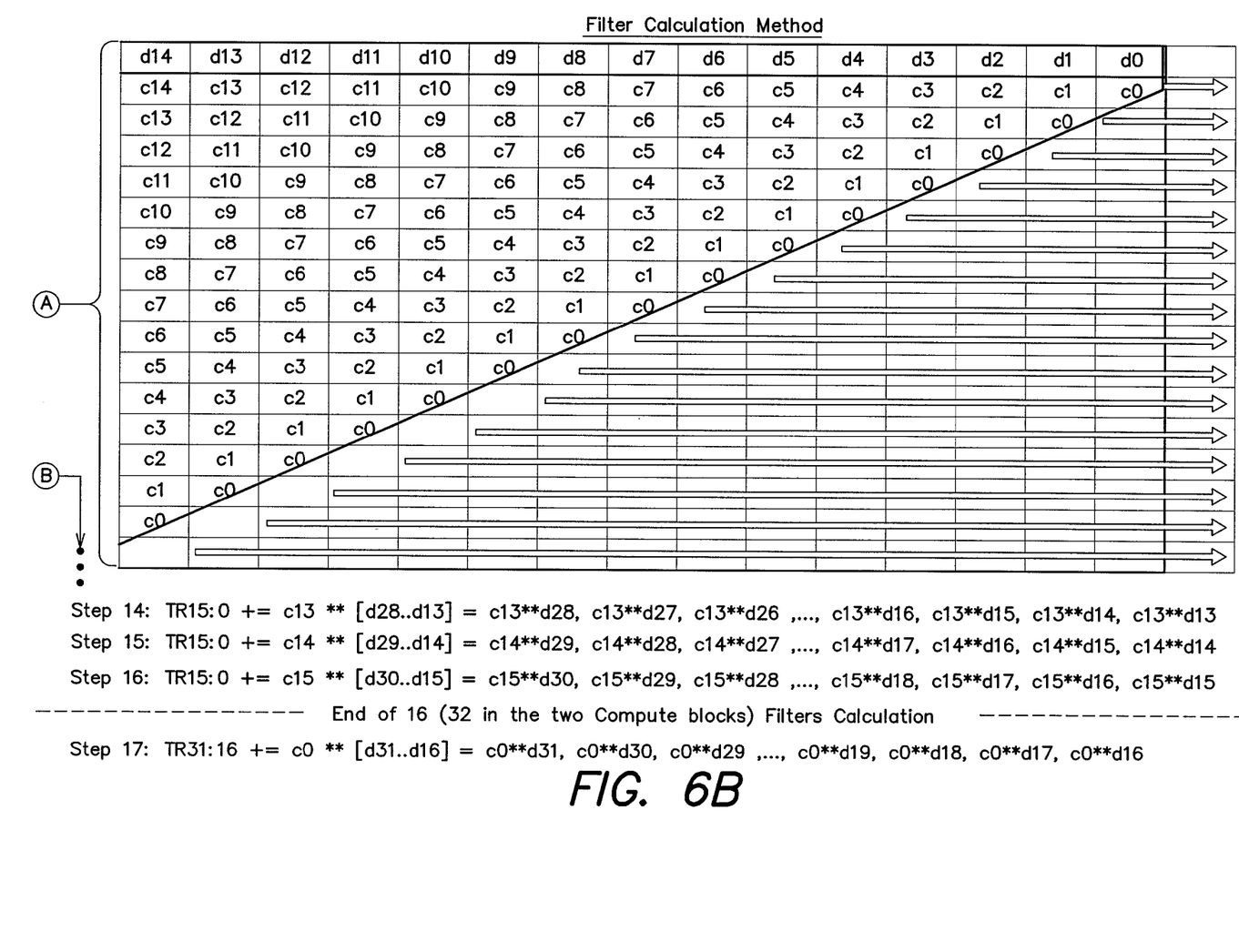

The data d15:d0 is stored in the THR7:0 (each data number is 16b only). The coefficient c0 is being loaded by Rms and multiplied by all the data numbers. Then the data in the THR is shifted to the right and d16 is loaded to the THR7h. Thus, the data in the THR7:0 inhabits data numbers d16:d1 and is ready for step 2.

FIR Calc. 16 taps

R31:28=q[k2+=0x4]; R27:24=q[j2+=0x4];; //1,2.load coefficients to R31:24
xR3:0=[k0+=0x4]; yR3:0=[j0+=0x4];; //1.load d7:d0 to xR3:0
    //2.load d39:d32 to yR3:0
xR7:4=[k0+=0x4]; yR7:4=[j0+=0x4];; //1.load d15:d8 to xR7:4
    //2.load d47:d40 to yR7:4
xR3:0=[k0+=0x4]; yR3:0=[j0+=0x4]; THR3:0=R3:0;; //1.load d23:d16 to xR7:4
    //2.load d55:d48 to yR7:4
    //3.load data to THR3:0
    THR7:4=R7:4;; //3.load data to THR3:0
xR7:4=[k0+=0x4]; yR7:4=[j0+=0x4]; TR15:0+=THR7:0**R24l,
THR7h=R0l (bc)(clr);;
    //Octal_data**single_tap (broadcast)
xR11:8=[k0+=0x4]; yR11:8=[j0+=0x4]; TR15:0+=THR7:0**R24h,
THR7h=R0h (bc);;
xR15:12=[k0+=0x4];yR15:12=[j0+=0x4];TR15:0+=THR7:0**R25l,
THR7h=R1l (bc);;
    TR15:0+=THR7:0**R25h, THR7h=R1h (bc);;
    TR15:0+=THR7:0**R26l, THR7h=R2l (bc);;
    TR15:0+=THR7:0**R26h, THR7h=R2h (bc);;
    TR15:0+=THR7:0**R27l, THR7h=R3l (bc);;
    TR15:0+=THR7:0**R27h, THR7h=R3h (bc);;
    TR15:0+=THR7:0**R28l, THR7h=R4l (bc);;
    TR15:0+=THR7:0**R28h, THR7h=R4h (bc);;
    TR15:0+=THR7:0**R29l, THR7h=R5l (bc);;
    TR15:0+=THR7:0**R29h, THR7h=R5h (bc);;
    TR15:0+=THR7:0**R30l, THR7h=R6l (bc);;
    TR15:0+=THR7:0**R30h, THR7h=R6h (bc);;
    TR15:0+=THR7:0**R31l, THR7h=R7l (bc);;
    TR15:0+=THR7:0**R31h, THR7h=R7h (bc);;
    R23:20=TR3:0;;
q[k1+=0x4]=xR23:20; q[j1+=0x4]=yR23:20; R23:20=TR7:4;;
q[k1+=0x4]=xR23:20; q[1+=0x4]=yR23:20; R23:20=TR11:8;;
q[k1+=0x4]=xR23:20; q[j1+=0x4]=yR23:20; R23:20=TR15:12;;
q[k1+=0x4]=xR23:20; q[j 1+=0x4]=yR23:20;;
The multiplication engine can be used to execute a matrix instruction (broadcast) as follows.

TRsh+=Rmd**Rnd(j)(clr)(sho)(f)    1)

TRsh+=Rmd**THRd(j)(clr)(sho)(f)    2)

TRsh+=Rmq**Rn(j)(clr)(sho)(f)    3)

TRsh+=Rmq**THR(j)(clr)(sho)(f)    4)

TRsh+=(Rmq,Rnq)**THRs(j)(clr)(sho)(f)(ns)    5)

Where:
Rmd—holds 4 data numbers, in total 64 bits operand.
Rnd,THRd—holds 4 coefficients numbers, in total 64 bits operand.
From FIG. 7 one may observe that in order to calculate the 4×4 matrix multiplication we need to make a 4 matrix accumulations. While each one of those matrix is the dot products of:

$<\underline{Ai,Ai}>+<\underline{Bi,Bi}>+<\underline{Ci,Ci}>+<\underline{Di,Di}>$ That means that in order to calculate matrix $\underline{A}$ we don't need to load 16 data numbers and 16 coefficients and then to multiply them, but we can bring only 4 data numbers and 4 coefficients and multiply each of the data numbers by each of the coefficients to accept the dot product. That method utilizes all the 16 multipliers and saves bus bandwidth.

General Matrix Calc. 4*([4*4]**[4*4]) - Continuous matrix calculation.

xyR9:8=q[k0+=0x4]; xyR11:10=q[j0+=0x4];; //1,2. xR11:8=
S(3,A1),S(2,A1),S(1,A1),S(0,A1),S(3,A0),S(2,A0),S(1,A0),S(0,A0)
    //yR11:8=
S(7,A1),S(6,A1),S(5,A1),S(4,A1),S(7,A0),S(6,A0),S(5,A0),S(4,A0)
xyR1:0=q[k1+=0x4]; yR3:2=q[j1+=0x4];; //1,2.xr3:0=
h(1,3),h(1,2),h(1,1),h(1,0),h(0,3),h(0,2),h(0,1),h(0,0)
    //yr3:0=
h(5,3),h(5,2),h(5,1),h(5,0),h(4,3),h(4,2),h(4,1),h(4,0)
xyR13:12=q[k0+=0x4]; xyR15:14=q[j0+=0x4];; 11,2. xR15:12=
S(3,A3),S(2,A3),S(1,A3),S(0,A3),S(3,A2),S(2,A2),S(1,A2),S(0,A2)
    //yR15:12=
S(7,A3),S(6,A3),S(5,A3),S(4,A3),S(7,A2),S(6,A2),S(5,A2),S(4,A2)
    //Start 2 Matrix calculation
xyR7:4=q[k1+=0x4]; xyR7:4=q[1+=0x4]; TR15:0+=R17:16 **
R1:0 (clr)(bc);;
xyR11:8=q[k0+=0x4]; xyR11:8=q[j0+=0x4]; TR15:0+=R19:18 **
R3:2 (bc);;
xR3:0=q[k1+=0x4]; yR3:0=q[1+=0x4]; TR15:0+=R21:20 ** R5:4
(bc);;
xR15:12=q[k0+=0x4]; yR15:12=q[j0+=0x4]; TR15:0+=R23:22 **
R7:6 (bc);;

```
//End of first 2 Start next 2 Matrix calculation
xR7:4=q[k1+=0x4]; yR7:4=q[j+=0x4]; TR31:16+=R17:16
** R1:0
(clr)(bc); R27:24=TR3:0;;
[k2+=0x4]=xR27:24; [j2+=0x4]=yR27:24; TR31:16+=R19:
18**
R3:2 (bc); R27:24=TR7:4;;
[k2+=0x4]=xR27:24; [j2+=0x4]=yR27:24; TR31:16+=R21:
20 **
R5:4 (bc); R27:24=TR3:0;;
[k2+=0x4]=xR27:24; [j2+=0x4]=yR27:24; TR31:16+=R23:
22**
R7:6 (bc); R27:24=TR7:4;;
[k2+=0x4]=xR27:24; [j2+=0x4]=yR27:24;
R27:24=TR3:0;;
[k2+=0x4]=xR27:24; [j2+=0x4]=yR27:24;
R27:24=TR7:4;;
[k2+=0x4]=xR27:24; [j2+=0x4]=yR27:24;
R27:24=TR3:0;;
[k2+=0x4]=xR27:24; [j2+=0x4]=yR27:24;
R27:24=TR7:4;;
[k2+=0x4]=xR27:24; [j2+=0x4]=yR27:24;;
    //End of 4 Matrix calculation
```

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A multiplication engine for a digital processor comprising:
    a plurality of multipliers, each receiving a first operand and a second operand;
        a local operand register having a plurality of locations to hold the first operands for plurality of multipliers, wherein the plurality of locations correspond to respective ones of the multipliers;
        a first operand bus coupled to the local operand register to supply the first operands from a compute register file to the local operand register;
        a second operand bus coupled to the plurality of multipliers to supply one or more of the second operands from the compute register file to respective ones of the multipliers; and
        a control unit responsive to a digital processor instruction to supply the first operands from the plurality of locations the local operand register to respective ones of the multipliers, to supply the second operands from the compute register file to respective ones of the multipliers on the second operand bus and to multiply the first operands by the respective second operands in the respective multipliers,
        wherein the control unit, upon detecting a first multiplication operation being executed by a first multiplier, causes the first operands to shift in the local operand register by a number of bits equal to a width of the first operands to respective next locations in the plurality of locations of the local operand register and supplies the shifted first operands to at least one subsequent multiplier corresponding to the respective next locations, thereby causing one or more of the first operands in the local operand register used by the first multiplier in the first multiplication operation to be reused by the at least one subsequent multiplier in at least one subsequent multiplication operation, and enabling two or more multiply instructions to be executed without reloading the local operand register with a complete set of new operands after each multiplication operation.

2. A multiplication engine as defined in claim 1, wherein the digital processor instruction comprises a correlation instruction.

3. A multiplication engine as defined in claim 1, further comprising a plurality of accumulators, one associated with each of the multipliers, each of the accumulators including at least one accumulation register.

4. A multiplication engine as defined in claim 3, wherein each of the accumulators includes two accumulation registers to permit concurrent reading and writing of the accumulation registers.

5. A multiplication engine as defined in claim 4, wherein the accumulation registers are local accumulation registers.

6. A multiplication engine as defined in claim 1, wherein the digital processor instruction comprises a matrix multiplication instruction.

7. A multiplication engine as defined in claim 1, wherein the control unit is configured to shift the first operands in the local operand register by a fixed shift in response to the digital processor instruction.

8. A multiplication engine as defined in claim 1, wherein the control unit is configured to shift the first operands in the local operand register by a programmable shift in response to information contained in the digital processor instruction.

9. A multiplication engine as defined in claim 1, wherein the first operand bus is coupled to supply one or more of the second operands from the compute register file to respective ones of the multipliers.

10. A multiplication engine as defined in claim 1, wherein the digital processor instruction comprises a broadcast matrix multiplication instruction, wherein the first operand comprises two or more first suboperands, wherein the second operand comprises two or more second suboperands and wherein all combinations of the first suboperands and the second suboperands are multiplied by the plurality of multipliers in response to the broadcast matrix multiplication instruction.

11. A multiplication engine as defined in claim 4, wherein each of the accumulators further comprises a summing unit to provide a current value that is placed in the accumulation registers.

12. A method for performing multiplication in a digital processor, comprising:
    loading first operands for a plurality of multipliers from a compute register file to a plurality of locations in a local operand register using a first operand bus, wherein a plurality of locations are configured to hold the first operands for respective ones of the multipliers,
    supplying second operands for the plurality of multipliers from the compute register file to respective ones of the plurality of multipliers using a second operand bus;
    controlling operation of the multipliers and the local operand register in response to a digital processor instruction by supplying the first operands from the plurality of locations of the local operand register to respective ones of the multipliers, supplying the second operands from the compute register file to respective ones of the multipliers on the second operand bus and multiplying the first operands by the respective second operands in respective ones of the multipliers;
    shifting the local operand register a number of bits equal to a width of the first operands to respective next locations in the plurality of locations of the local operand register upon detecting a first multiplication operation being executed by a first multiplier; and supplying the shifted first operands to at least one subsequent multiplier corresponding to the respective next locations, thereby causing one or more of the first operands in the local operand register used by the first multiplier in the first multiplication operation to be reused by the at least one subsequent multiplier in at least one subsequent multiplication operation and enabling two or more multiply instructions to be executed without reloading the local operand register with a complete set of new operands after each multiplication operation.

13. A method of claim 12, further comprising generating a multiplication value in the subsequent multiplier and summing the multiplication value with a value stored in an accumulation register to provide an update value.

* * * * *